Patented Feb. 22, 1944

2,342,400

UNITED STATES PATENT OFFICE 2,342,400

PRODUCTION OF POLYMERIZATION PRODUCTS FROM ETHYLENE

Heinrich Hopff, Siebert Goebel, and Curt W. Rautenstrauch, Ludwigshafen-on-the-Rhine, Germany, assignors, by mesne assignments, to General Aniline & Film Corporation, New York, N. Y., a corporation of Delaware No Drawing. Application December 14, 1939, Serial No. 309,238. In Germany December 23, 1938

10 Claims. (Cl. 260—78)

The present invention relates to a process for the production of polymerization products.

Ethylene as is known may be polymerized yielding film-forming polymerization products by applying very high pressures, say above 1000 atmospheres, and high temperatures. Since a strong evolution of heat takes place during the polymerization, it is difficult, when working on a technical scale, to carry off uniformly the heat evolved under such extremely high pressures and to render the polymerization uniform. When leading off the heat insufficiently, however, the pressure rising spontaneously may get dangerous to those engaged in the operation.

We have now found that these disadvantages are avoided and valuable polymerization products are obtained with no danger by polymerizing ethylene alone or admixed with other polymerizable organic compounds in an aqueous emulsion using oxygen or substances supplying oxygen as polymerization accelerators. It is surprising that ethylene can be polymerized in an aqueous emulsion at all, for the reason that many unsaturated compounds, more particularly aliphatic hydrocarbons, as for example isobutylene, capable of block-polymerization, i. e. of polymerization in a coherent mass, are known to be unpolymerizable in aqueous emulsion.

The polymerization is generally carried out in vessels withstanding high pressures, the conditions being as usual in emulsion polymerization.

In practice ethylene or mixtures of ethylene and other organic substances capable of being polymerized under the reaction conditions are emulsified in an aqueous solution of an emulsifying agent by shaking or agitating to thus form a fine milk and heated to a temperature preferably of about 60° to 150° C. after adding the polymerization accelerator and, if desired, also polymerization regulators, as for example aldehydes, such as acetaldehyde or propionaldehyde. Higher or lower temperatures may, however, also be employed.

When ethylene is used alone pressures ranging from 800 to 1500 atmospheres may arise. In the preparation of interpolymerization products, however, slighter pressures generally occur. The separation of the polymerization products from the dispersions obtained may be accomplished in a known manner by precipitation with electrolytes.

Among suitable polymerizable compounds to be used for interpolymerization purposes there may be mentioned for example vinyl chloride, vinyl acetate and vinyl esters of other carboxylic acids, acrylic or methacrylic acid esters, acrylic acid nitrile, styrene, vinyl ethers, vinyl carbazole, fumaric acid esters, citraconic acid esters, furthermore dienes, as butadiene, isoprene, dimethylbutadiene or $\beta$-chlorbutadiene.

Generally speaking suitable emulsifiers are those substances which contain a lipophilic and hydrophilic group and which reduce the surface tension of water, as alkylated naphthalene sulphonic acids, fatty alcohol sulphonates, taurides of higher fatty acids, sulphonated fatty acid amides, the addition products of several molecules of ethylene oxide on to fatty alcohols or fatty amines and the products resulting in the interaction of fatty amines and aliphatic dichloro compounds, especially $\beta.\beta'$-dichlordiethyl ether.

Among oxygen-supplying substances suitable for use as polymerization catalysts there may be mentioned for example hydrogen peroxide, persulphates, percarbonates, perborates, benzoyl peroxide, peracetic acid and diacetyl peroxide.

Depending on the initial materials employed the polymerization products are either rubberlike masses or white powders. They may be masticated on heated rollers, drawn into foils or shaped into tubes, rods or similar structures by means of an extrusion press. They are good electrical insulators. They are soluble in many organic solvents, for example methylene chloride, cyclohexanone or chlorbenzene. The solutions may serve for the preparation of films, threads, impregnations, coatings or agglutinations or various articles by the immersion process. Dispersions of the polymerization products may serve the same purposes.

The following examples serve to illustrate how the present invention may be carried out in practice, but the invention is not restricted to these examples. The parts are by weight.

Example 1

Ethylene is emulsified in 500 parts of a 2 per cent solution of the sodium salt of alpha-hydroxyoctodecane sulphonic acid, 2.5 parts of ammonium persulphate and 5 parts of hydrogen peroxide in a pressure-tight vessel under a pressure of 1200 atmospheres and then polymerized at a temperature of 130° C. The polymerization product obtained after 2 days' polymerization in the form of an aqueous dispersion is precipitated in the usual manner by means of an electrolyte. A white powder is thus obtained which softens above 100° C. and can be pressed and drawn into elastic films on rollers.

*Example 2*

500 parts of fumaric acid diethyl ester are emulsified in a closed vessel in 1500 parts of a 2 per cent solution of the sodium salt of alpha-hydroxyoctodecane sulphonic acid containing 5 parts of potassium persulphate and 20 parts of hydrogen peroxide, 10 atmospheres of nitrogen and 60 atmospheres of ethylene then being forced in. By heating to 80° C. while stirring polymerization occurs. The pressure which rises at first soon decreases to 60 to 65 atmospheres. By continuously pressing in fresh ethylene the pressure is kept at from 70 to 80 atmospheres. When the pressure no longer decreases, the aqueous dispersion of the polymerization product formed is coagulated by the addition of an electrolyte, as for example aluminum sulphate. The coagulate, after being washed with water and dried, results in the form of a rubber-like, colorless and translucent mass. It may be used if desired after the addition of fillers and dyestuffs for covering cables and packing purposes.

*Example 3*

300 parts of vinyl chloride are emulsified in a pressure-tight vessel in 1500 parts of a 2 per cent solution of the sodium salt of alpha-hydroxyoctodecanesulphonic acid containing 3 parts of potassium persulphate and 10 parts of hydrogen peroxide. 10 atmospheres of nitrogen and 60 atmospheres of ethylene are then pressed in and the polymerization is effected at 80° C. At the beginning of the polymerization the pressure rises, but soon it falls to 60 to 65 atmospheres when the polymerization proceeds. By continuously pressing in ethylene the pressure is kept at from 70 to 80 atmospheres. When the pressure no longer decreases, the polymerization product is precipitated by the addition of an electrolyte. A white powder is thus obtained, which after being washed and dried, may be pressed in the heat to colorless slabs.

*Example 4*

500 parts of acrylic acid ethyl ester are emulsified in a pressure-tight vessel in 1500 parts of a 4 per cent aqueous solution of the condensation product of 1 molecular proportion of beta-beta'-dichlordiethyl ether and 2 molecular proportions of a mixture of higher molecular weight amines obtained from carboxylic acids from the paraffin oxidation by way of the nitriles. After adding 1 part of potassium persulphate and 10 parts of hydrogen peroxide 10 atmospheres of nitrogen and 60 atmospheres of ethylene are forced in and the emulsion is heated at 80° C. After an initial rise the pressure soon falls to 60 to 65 atmospheres. It is then kept at 70 to 80 atmospheres by continuously pressing in fresh ethylene. When the pressure no longer decreases, the resulting interpolymerization product is precipitated by the addition of electrolytes. After washing and drying it is a rubber-like mass.

What we claim is:

1. A process of producing solid polymerization products from ethylene which comprises subjecting ethylene to polymerization in an aqueous emulsion in the presence of a substance supplying oxygen, under superatmospheric pressures at which polymerization takes place.

2. A process for producing solid polymerization products from ethylene which comprises subjecting to polymerization a mixture of ethylene and a further organic compound capable of polymerization and having ethylenic unsaturation in an aqueous emulsion in the presence of a substance supplying oxygen, under superatmospheric pressures at which polymerization takes place.

3. A process for producing solid polymerization products from ethylene which comprises subjecting a mixture of ethylene and vinyl chloride to polymerization in an aqueous emulsion in the presence of a substance supplying oxygen, the ethylene being introduced into the emulsion under a pressure of at least 60 atmospheres, and subsequently maintaining the pressure at a range of from 70–80 atmospheres until polymerization is completed.

4. A process for producing solid polymerization products from ethylene which comprises subjecting a mixture of ethylene and fumaric acid diethyl ester to polymerization in an aqueous emulsion in the presence of a substance supplying oxygen, the ethylene being introduced into the emulsion under a pressure of at least 60 atmospheres, and subsequently maintaining the pressure at a range of from 70–80 atmospheres until polymerization is complete.

5. A process of producing solid polymerization products from ethylene which comprises subjecting to polymerization a mixture of ethylene and another polymerizable compound containing a $CH_2=C<$ group, in an aqueous emulsion in the presence of a substance supplying oxygen, under superatmospheric pressures at which polymerization takes place.

6. A process for producing solid polymerization products from ethylene which comprises subjecting to polymerization a mixture of ethylene and a polymerizable vinyl ester in an aqueous emulsion in the presence of a substance supplying oxygen, under superatmospheric pressures at which polymerization takes place.

7. A process for producing solid polymerization products from ethylene which comprises subjecting to polymerization a mixture of ethylene and vinyl acetate in an aqueous emulsion in the presence of a substance supplying oxygen, under superatmospheric pressures at which polymerization takes place.

8. A process for producing solid polymerization products from ethylene which comprises subjecting to polymerization a mixture of ethylene and a polymerizable ester of a dibasic unsaturated acid, in an aqueous emulsion in the presence of a substance supplying oxygen under superatmospheric pressures at which polymerization takes place.

9. A process for producing solid polymerization products from ethylene which comprises subjecting to polymerization a mixture of ethylene and vinyl chloride in an aqueous emulsion in the presence of a substance supplying oxygen, under superatmospheric pressures at which polymerization takes place.

10. A process for producing solid polymerization products from ethylene which comprises subjecting to polymerization a mixture of ethylene and fumaric acid diethyl ester in an aqueous emulsion in the presence of a substance supplying oxygen, under superatmospheric pressures at which polymerization takes place.

HEINRICH HOPFF.
SIEBERT GOEBEL.
CURT W. RAUTENSTRAUCH.